(12) United States Patent
Finkelstein et al.

(10) Patent No.: US 12,386,047 B2
(45) Date of Patent: Aug. 12, 2025

(54) SYSTEMS AND METHODS OF CALIBRATION OF LOW FILL-FACTOR SENSOR DEVICES AND OBJECT DETECTION THEREWITH

(71) Applicant: AEye, Inc., Dublin, CA (US)

(72) Inventors: Hod Finkelstein, Dublin, CA (US); Allan Steinhardt, Dublin, CA (US)

(73) Assignee: AEye, Inc., Dublin, CA (US)

( * ) Notice: Subject to any disclaimer, the term of this patent is extended or adjusted under 35 U.S.C. 154(b) by 922 days.

(21) Appl. No.: 17/542,192

(22) Filed: Dec. 3, 2021

(65) Prior Publication Data

US 2023/0075080 A1 Mar. 9, 2023

Related U.S. Application Data

(60) Provisional application No. 63/233,713, filed on Aug. 16, 2021.

(51) Int. Cl.
*G01S 7/497* (2006.01)
*G01S 7/481* (2006.01)
*G01S 7/486* (2020.01)
*G01S 17/894* (2020.01)

(52) U.S. Cl.
CPC ............ *G01S 7/497* (2013.01); *G01S 7/4817* (2013.01); *G01S 7/4868* (2013.01); *G01S 17/894* (2020.01)

(58) Field of Classification Search
None
See application file for complete search history.

(56) References Cited

U.S. PATENT DOCUMENTS

| | | |
|---|---|---|
| 10,459,103 B1 | 10/2019 | Shi et al. |
| 2018/0210075 A1 | 7/2018 | Kim et al. |
| 2019/0120946 A1 | 4/2019 | Wheeler et al. |
| 2020/0158836 A1 | 5/2020 | Henderson et al. |
| 2020/0357140 A1 | 11/2020 | Kroeger |
| 2022/0308171 A1* | 9/2022 | Greene ................. G01S 7/4802 |

OTHER PUBLICATIONS

International Search Report and Written Opinion for PCT/US2022/040370, dated Oct. 19, 2022 (10 pages).

* cited by examiner

*Primary Examiner* — Eric L Bolda
(74) *Attorney, Agent, or Firm* — Ahmann Kloke LLP

(57) ABSTRACT

The present disclosure relates to calibration of actively illuminated low fill-factor sensor devices and object detection, including capturing one or more returns in a first scan direction, assigning first timestamps corresponding to one or more of the returns in the first scan direction, identifying one or more peaks corresponding to intensity of one or more of the returns, correlating peak timestamps with one or more time intervals, the peak timestamps being associated with the peaks, generating a scan timing interval based on the peak timestamps, and calibrating one or more input devices or output devices based on the scan timing interval.

20 Claims, 12 Drawing Sheets

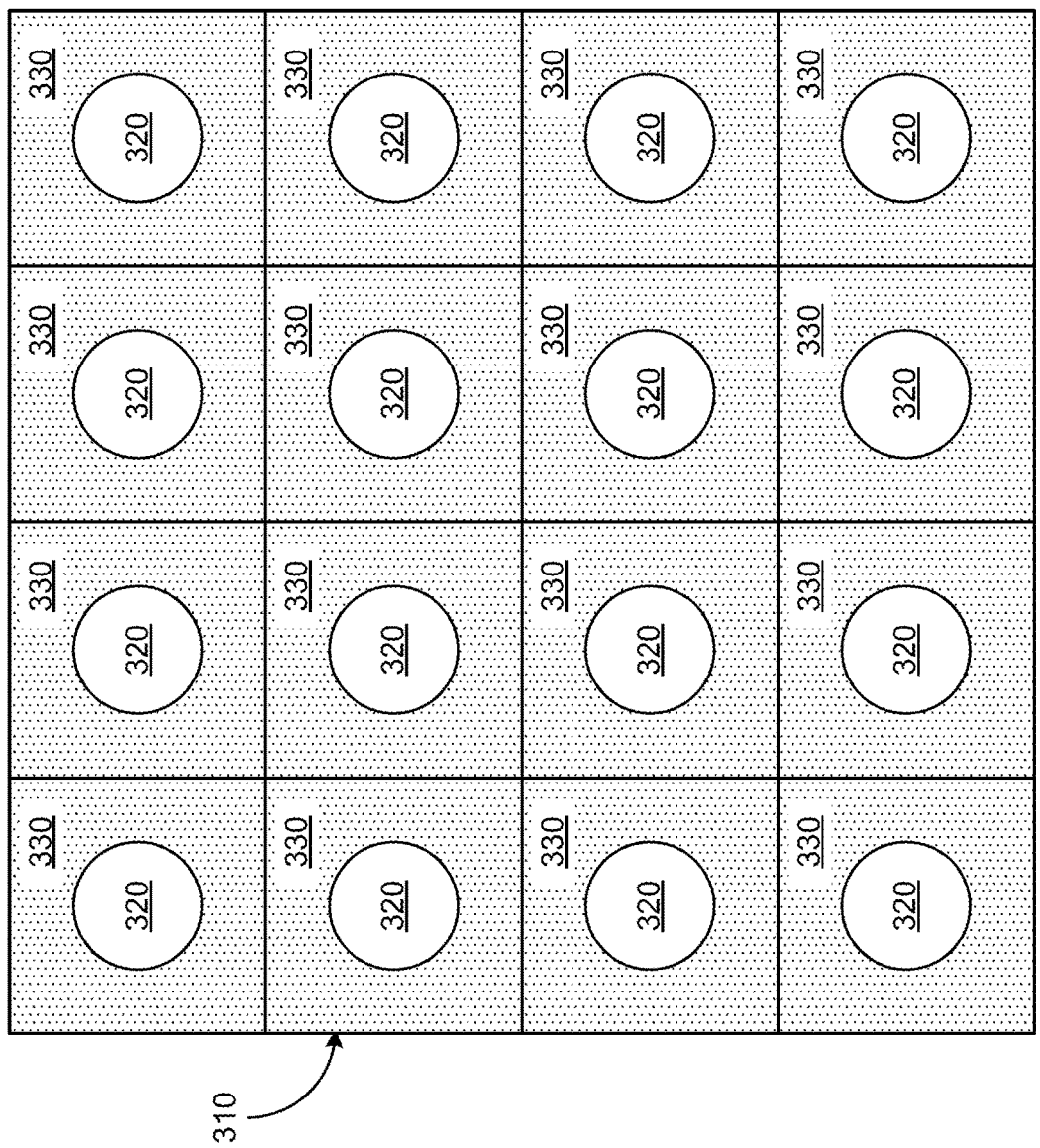

400

| | |
|---|---|
| Operating System 410 | Scan Driver 440 |
| Point Capture Processor 420 | Scan Direction Controller 442 |
| Point Projector Controller 422 | Scan Velocity Controller 444 |
| Point Detection Controller 424 | Scan Timing Controller 446 |
| Projector Beam Controller 430 | Scan Timing Calibration Engine 450 |
| Continuous Mode Controller 432 | Timing Transformer 452 |
| Pulse Mode Controller 434 | Timing Peak Extractor 454 |

Fig. 4

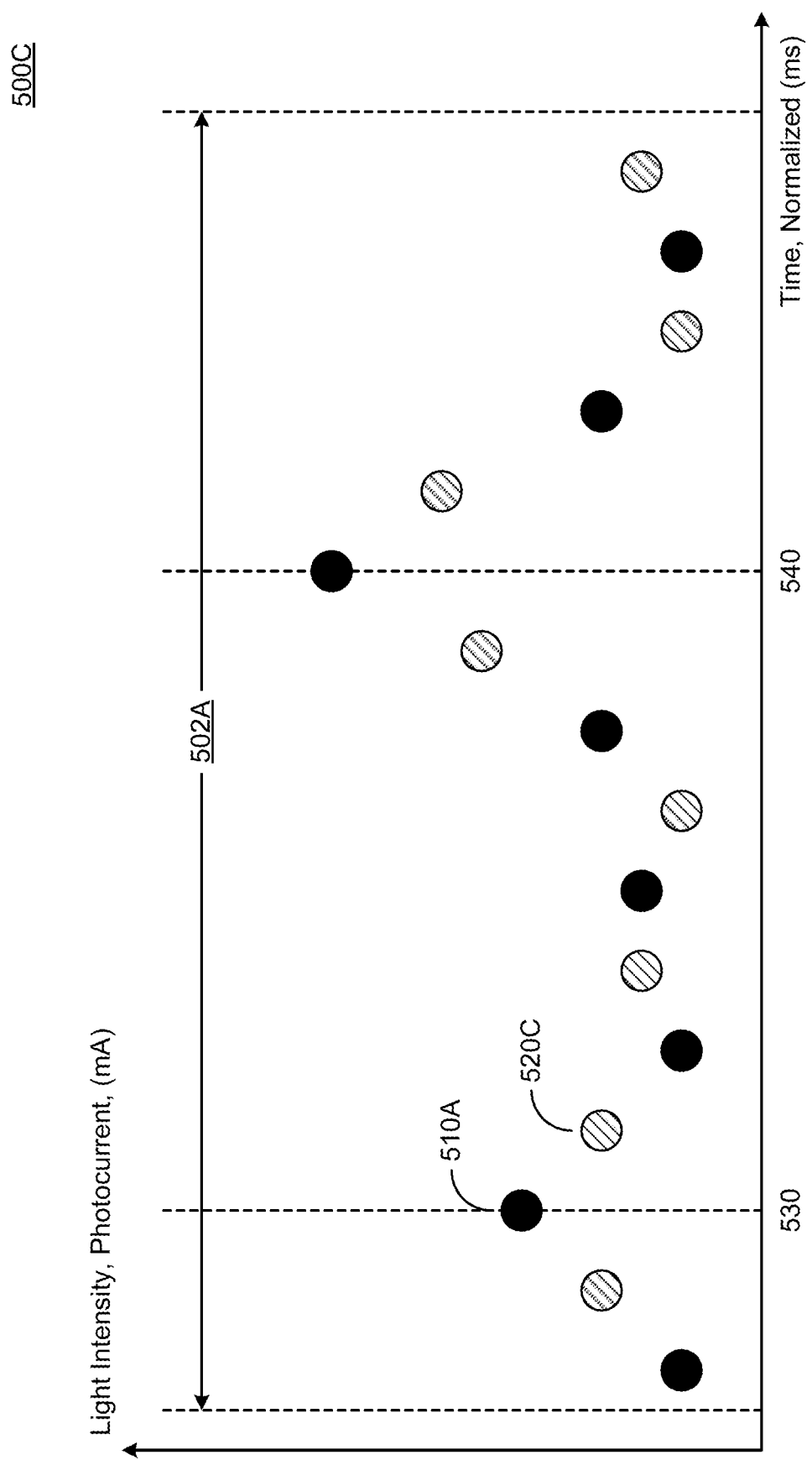

SYSTEMS AND METHODS OF CALIBRATION OF LOW FILL-FACTOR SENSOR DEVICES AND OBJECT DETECTION THEREWITH

CROSS-REFERENCE TO RELATED PATENT APPLICATIONS

This application claims priority to U.S. Provisional Patent Application Ser. No. 63/233,713, entitled "OPTIMIZED SCANNED ILLUMINATION WITH LOW FILL-FACTOR SENSORS," filed Aug. 16, 2021, the contents of such application being hereby incorporated by reference in its entirety and for all purposes as if completely and fully set forth herein.

TECHNICAL FIELD

The present disclosure relates generally to sensor devices, and more particularly to calibration of low fill-factor sensor devices and object detection therewith.

BACKGROUND

Light detection and ranging (LIDAR) devices have been implemented for automotive and industrial applications. Conventional LIDAR systems sometimes cannot efficiently and effectively sense the surrounding object in three dimensions.

SUMMARY

Present implementations improve deployment of electrical and optical power in LIDAR systems having a low f-number and a low-fill-factor. Calibration of low fill-factor sensor devices and object detection therewith are disclosed herein.

BRIEF DESCRIPTION OF THE DRAWINGS

These and other aspects and features of the present implementations will become apparent to those ordinarily skilled in the art upon review of the following description of specific implementations in conjunction with the accompanying figures.

FIG. 3A illustrates an example sensor device, in accordance with present implementations.

FIG. 4 illustrates an example structure of a system memory of the system, in accordance with present implementations.

FIG. 5C illustrates a third example calibration state of a sensor device, further to the example state of FIG. 5B.

DETAILED DESCRIPTION

Figure 1:
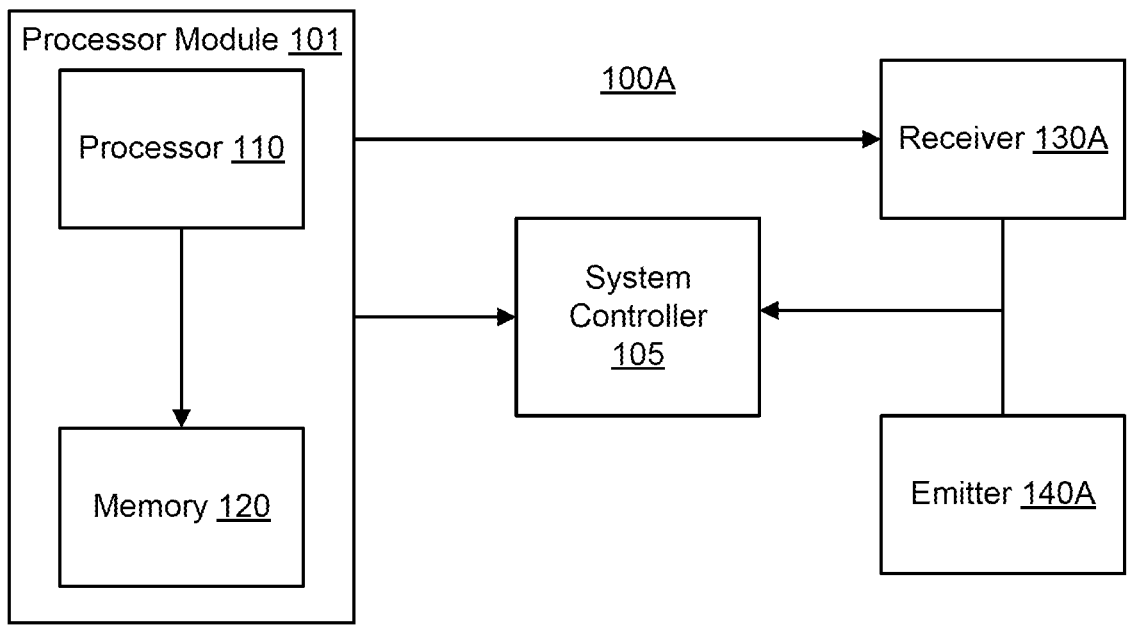
FIG. 1 illustrates an example system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Present implementations can include one or more sensor systems having emitters and receivers, and one or more processing and memory systems located with, affixed to, integrated with, or associated with for example, a vehicle. The vehicle can include an autonomous vehicle, a partially autonomous vehicle, a vehicle in which one or more components or systems thereof can operate at least partially autonomously, or any combination thereof, for example. The sensor systems can include LAser Detection And Ranging (LADAR) or LIDAR systems as discussed above, and can scan across an environment to generate an image of an object or a portion of an object.

Present implementations can include bistatic active-illumination systems with scanning mirrors. The scanning mirrors can include micro-electromechanical sensor (MEMS) mirrors to scan one or more laser beams across a field of illumination, field of view, or the like. Bistatic active-illumination systems can use a collection lens to focus the returning signal onto a focal plane array (FPA) containing detector pixels. FPA pixels can have a low fill factor.

More particularly sensor detector materials can include semiconductor materials exhibiting dark current behavior, in which a pixel can generate a response current in the absence of substantial stimulus. Dark current may negatively affect the signal-to-noise ratio (SNR) of the system or its dynamic range. Since dark current may be proportional to the area of the active area of a detector, pixels can be engineered to have a smaller active area in order to reduce the dark current, for example, 5 um or 10 um, in order to minimize the dark current to acceptable levels. Concurrently, pixel pitch may be greater than the active area, e.g., 20 um, 30 um, 40 um, 50 um, 75 um, 100 um, to accommodate optics of a system. Accordingly, the ratio of active area to pixel pitch, known as the fill-factor, can be lowered such that dark current is maintained at an acceptable level without changing the collection lens area, the field of view, or the angular resolution of the receiver. However, when the fill-factor becomes low, complicated and expensive optics may be implemented. For example, to compensate for low-fill factor, low-fill factor pixels can include a microlens array to increase the effective collection efficiency, thus compensating for the low fill factor. Present implementations can advantageously reduce or avoid the usage of microlens arrays, to reduce at least manufacturing complexity and cost of device.

FIG. 1 illustrates an example system in accordance with present implementations. As illustrated by way of example in FIG. 1, an example system 100 can include a processor module 101 (including at least one system processor 110 and at least one system memory 120), at least one receiver 130A, at least one emitter 140A, and a system controller 105. In some implementations, the system controller 105 controls the receiver 130A and the emitter 140A. For example, the system controller 105 sets the timing signals for the emitter 140A and the receiver 130A. The processor module 101 processes the raw output received from the receiver 130A and determines, generates, or otherwise produces a point cloud and feedback instructions (if any). The processor module 101 sends the feedback instructions to the system controller 105 to instruct the system controller 105 where to scan (e.g., where to direct the emitter 140A and the receiver 130A).

The receiver 130A can receive light echoes from objects, e.g., emitter photons reflected from the object. The objects can include surfaces, buildings, cars, and people on reflections, for example. The receiver 130A can include one or more detectors operable to receive and detect light emitted by the emitter 140A and reflected from an object. The detectors can be arranged in a one- or two-dimensional array, a grid or grid-like structure, and can detect one or more values corresponding to one or more coordinates associated with an object. The detectors can include but are not limited to, photosensitive electrical, electronic, or semiconductor devices. As one example, an object can be associated with or identified using polar coordinates (e.g., a coordinate space having an azimuthal and vertical angles and a range from the LIDAR). Alternatively, an object can be associated with or identified using a Cartesian space (e.g., an XYZ coordinate space having an x-axis, a y-axis, and a z-axis, with each axis being orthogonal to all others in the coordinate space).

The receiver 130A can convert the optical energy of the returned light beam or the like reflected from the object and originating from the emitter 140A into electrical energy for subsequent processing (e.g. by module 101). For example, module 101 can generate at least one range based on intensity and/or a time difference between a time of emission of the beam or pulse of light from the emitter 140A and a time of receipt of the beam or pulse of light at the receiver 130A. In some embodiments, the receiver 130A may receive multiple beams or pulses of light simultaneously or concurrently, and can associate each received beam or pulse with at least one coordinate-set of a coordinate system. It is to be understood that the image capture elements are not limited to a grid or grid-like arrangement.

The emitter 140A can emit or project, for example, one or more light beams or pulses into the environment. In some examples, the emitter 140A can include a single emitter element (e.g., a single light projection element) which sequentially scans or illuminates regions of the environment. Thus, the emitter 140A can project one or more beams or pulses of light with respect to a coordinate system of the receiver 130A. As one example, the emitter 140A can project a plurality of light beams arranged linearly into an object. Each of the plurality of light beams can be defined using a suitable coordinate system such as the polar coordinate system. For example, the emitter 140A can project a line of light beams in a direction which corresponds to the R axis. The emitter 140A can also move the orientation of a light projection array (disposed therein and including one or more light projection elements) along the azimuth direction (or a horizontal direction) and along the elevation direction (or a vertical direction). As one example, the emitter 140A can move the light projection array along the azimuth direction or the elevation direction in accordance with a predetermined step or angle. It is to be understood that the light projection elements are not limited to a fixed orientation and are not limited to the axes or coordinate systems discussed herein by way of example. The light projection elements can include at least one of, but are not limited to, light-emitting diodes, Vertical Cavity Surface Emitting Laser, Edge Emitting Laser, Fiber Lasers, chemical laser emitters, light focusing elements, lenses, and collimators.

Figure 2:
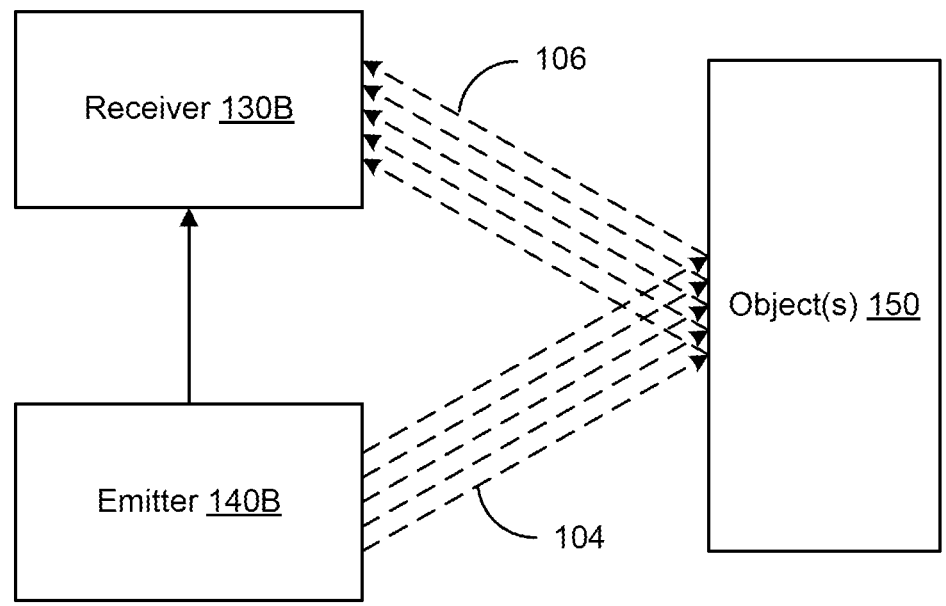
FIG. 2 illustrates an example system in an operating state further to the example system of FIG. 1.

The components may communicate with each system using a bus or other suitable median. FIG. 2 illustrates an example system in an operating state further to the example system of FIG. 1. As illustrated by way of example in FIG. 2, an example system 200 in an operating state includes a receiver 130B and an emitter 140B. The receiver 130B is configured to be in the operating state of receiving reflected light 106 from an object 150. The emitter 140B is in the operating state of projecting light 104 onto the object 150. The processor module 101 and the system controller 105 are not shown in FIG. 2 for clarity.

The receiver 130B in the operating state can receive reflected light 106 from the object 150. The receiver 130B in the operating state can include an array of detectors placed at the focal plane of receiver optics which is designed to collect the reflected light 106. The receiver 130B can move across the field of view along an axis for example, corresponding to an axis of movement of the emitter 140B.

The emitter 140B in the operating state can emit or project light 104 onto the object 150. The emitter 140B in the operating state is oriented toward the object to project the light 104 onto the object 150, for example, at an angle with respect to the object 150 to reflect, bounce, or the like, at least a portion of the light 104 from at least one surface of the object 150 to result in the reflected light 106.

The object 150 can include any portion of an object proximate to the system 200. The object 150 can include a ground surface on which the system 200 or a vehicle including, integrated with, coupled with or associated with, for example, the system 200. The object 150 can include multiple objects in the object or part of the object, either permanently or impermanently. As one example, the object 150 can include a ground surface, vehicles, pedestrians, bicycles, trains, or the like moving within, into or out of the object, or features of the object including the built object or natural object surrounding the vehicle. Objects 150 can also include trees, traffic structures, roadways, railways, buildings, blockades, barriers, and benches, for example.

Present implementations allow for optimized deployment of electrical and optical power in a bistatic LIDAR system or the like having a low f-number and a low-fill-factor sensor array.

FIG. 3A illustrates an example sensor device, in accordance with present implementations. As illustrated by way of example in FIG. 3A, a sensor device 300A can include a sensor array 310 including a plurality of sensor pixels 330. The sensor pixels 330 can each include corresponding active areas 320. Though illustrated as circular regions, it is to be understood that the active areas 320 are not limited to circular regions. As one example, the active areas 320 can include any one or more of circles, squares, rectangles, octagons, hexagons, or any polygons. The sensor pixels 330 can each have a low-fill factor, where a low-fill factor can correspond to an active area 320 having a surface area less than a surface of the sensor pixel 330 for that active area 320. As one example, a low fill factor can include a surface area of an active area 320 of 5%, 10%, 25%, or 40% of the surface area of a corresponding sensor pixel 330. It is to be understood that the low-fill factors are not limited to the examples discussed above. It is to be further understood that the sensor array 310 is not limited to the number of sensor pixels 330 illustrated herein, and is not limited to the shape of the sensor array 310 illustrated herein.

The sensor array 310 can focus a returning point onto a spot on the focal plane array with a dimension on the order of the active area of a pixel. For example, an active area may be 3 μm×3 μm, a pixel pitch may be 10 μm×10 μm, and a spot size may be 2.5 μm. A spot size can correspond to a distance from a peak of the spot to 1/e of the peak of the spot.

The sensor array 310 can be moveably oriented to an azimuth and elevation in the field of view. More than one pixel can be connected to a circuit which senses and digitizes the photocurrent. For example, every 2 pixels can be connected to a single circuit. A processing element identifies the first and second peaks corresponding to the timing of the first and second pixels imaging the target. A control circuit can activate groups of pixels sequentially, for example such that only one group of pixels is active at any given time and such that the time when no pixels are activated is minimized. One or more groups of pixels can be connected to a single processing element. Positions of the sensor array 310 can be known and the positions of the sensor array 310 can govern determinations by at least the system processor 110 as to which group of pixels is activated at a given time.

Photodetection can be performed using a PIN diode. Detection can be performed using an Avalanche Photodiode (APD) or a Geiger-mode APD (e.g., Single Photon Avalanche Diode or SPAD). Here, each acquisition can include one or more pulses, and one or more circuits can measure times of arrival of photons. In some embodiments, arrival times are derived from the analog intensity signal of the acquired echo from a single pulse. In some embodiments, the processor module 101 generates a histogram of arrival times from multiple emitter pulses, such that the non-correlated signals produce a largely flat histogram and the signal peak position can be determined via hardware or software.

Figure 3B:
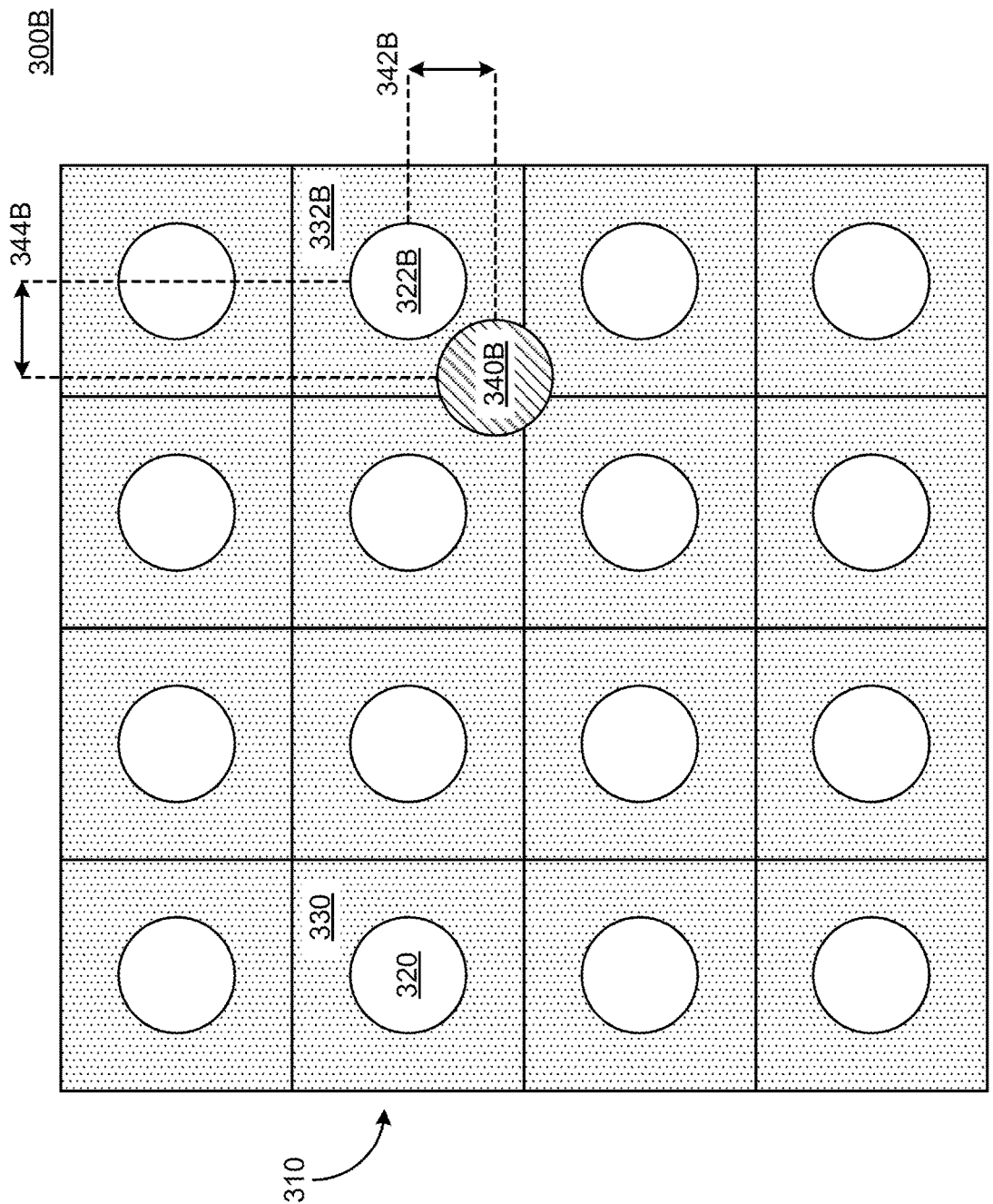
FIG. 3B illustrates an example sensor device in a first operating state, further to the example device of FIG. 3A.

FIG. 3B illustrates an example sensor device system in a first operating state, further to the example device of FIG. 3A. As illustrated by way of example in FIG. 3B, a sensor device 300B can include the sensor array 310 including the plurality of sensor pixels 330, and a returned point of light 340B at a first position. The sensor pixels 330 can each include the corresponding active areas 320. The returned point of light 340B can be offset from a target active area 322B of a target sensor pixel 332B by a first displacement distance along a first direction 342B and a second displacement distance along a second direction 344B. The first direction 342B can be substantially perpendicular from the second direction 344B. The returned point of light 340B can be one of a plurality of returned points of light (referred to herein as "points" or "returns").

A fill factor associated with a sensor pixel can be sufficiently low such that there may be a non-negligible probability that incoming light may land on an area outside the active area of a pixel and will thus not be detected. An example is shown by the returned point of light 340B. As one example, a configuration can include a beam diameter on a focal plane array of 40 um, which can also be a dimension of an active area, with a pixel pitch of 50 um. If there is no active alignment between the emitter and receiver or if the emitter scans points which are imaged between the active areas even with active alignment, the returned point of light 340B may be imaged completely on the active area of a pixel or be imaged such that a significant proportion of the returning signal falls in a blind region, between the collection area of adjacent pixels. In the example above, up to 45% of the returning light may impinge the area between active regions. Further, for sufficiently low fill factors, the returned point of light 340B can fall completely between active areas and thus not be detected. Light which impinges on the area between the active regions may either be not collected (create an electron-hole pair which may recombine), or may cause a temporal distortion due to slow charge diffusion. Present implementations can thus advantageously reduce or eliminate the number and frequency of such lost points not detected between activate areas of sensor pixels of a sensor array. Further, it can be advantageous to minimize power drawn by the emitters to reduce the drain of the scanning input devices on a battery or power system and to improve the eye safety performance of the system. Therefore, it is advantageous to maximize collection of the light reflected from a target which impinges on the collection lens.

Traditionally, maximizing collection of light reflected from a target which impinges on the collection lens is addressed by providing a microlens array placed above the pixel array such that more light which impinges on the FPA will reach the active area of the pixels than would be possible without a microlens array. Many such microlens array are manufactured using materials having a relatively low refractive index (e.g., <1.5 or <2). As such, light-bending ability of the microlens is limited. In systems with a high numerical aperture (NA) or a low fill factor (e.g., <1), light arrives at the FPA at a high diversity of angles, and therefore cannot be efficiently coupled to the active area of the pixel.

Figure 3C:
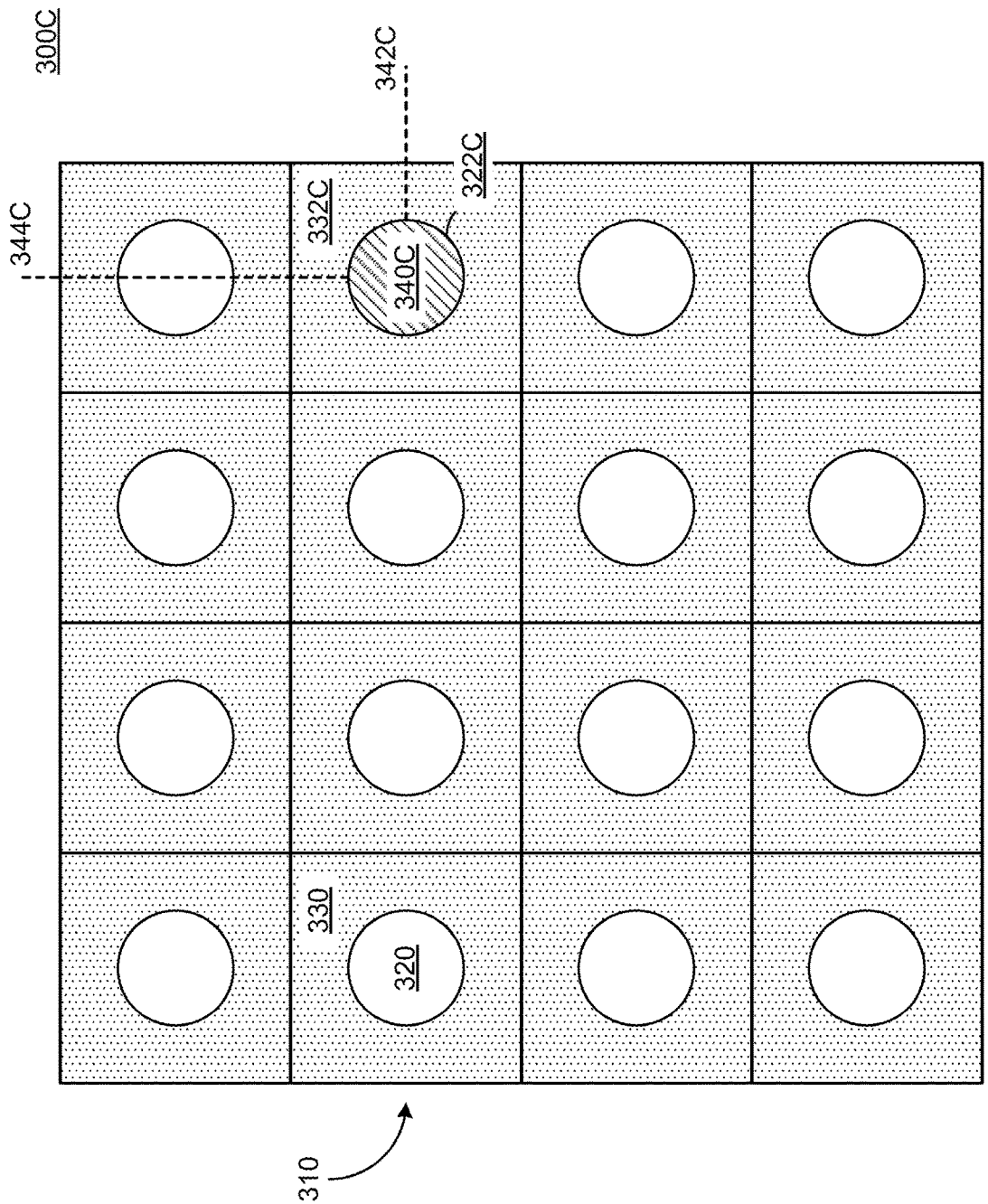
FIG. 3C illustrates an example sensor device in a second operating state, further to the example device of FIG. 3B.

FIG. 3C illustrates an example sensor device in a second operating state, further to the example device of FIG. 3B. As illustrated by way of example in FIG. 3C, a sensor device 300C can include the sensor array 310 including the plurality of sensor pixels 330, and a returned point of light 340C at a first position. The sensor pixels 330 can each include the corresponding active areas 320. The returned point of light 340C can be aligned with a target active area 322C of a target sensor pixel 332C along a first direction 342C and along a second direction 344C. The first direction 342C can be substantially perpendicular from the second direction 344C. The returned point of light 340C can be one of a plurality of returned points of light. Here, the returned point of light 340C can be advantageously aligned with the target active area 322C of the target sensor pixel 332C and effectively detected at the target sensor pixel 332C.

FIG. 4 illustrates an example structure of a system memory of the system, in accordance with present implementations. As illustrated by way of example in FIG. 4, an example system memory 400 can include an operating system 410, a point capture processor 420, a projector beam controller 430, a scan driver 440, and a scan timing calibration engine 450. The system memory 400 can correspond in at least one of structure and operation to the system memory 120.

The operating system 410 can include hardware control instructions and program execution instructions. The operating system 410 can include a high level operating system, a server operating system, an embedded operating system, or a boot loader. The operating system 410 can include one or more instructions operable specifically with or only with the system processor 110.

The point capture processor 420 can include one or more instructions to generate one or more points associated with a field of illumination or a field of view and at least one coordinate space corresponding to the field of illumination or a field of view. The point capture processor 420 can include instructions to operate one or more LIDAR or LADAR image capture devices, for example, including one or more point projectors, time-of-flight sensors, and the like. The point capture processor 420 can include a point projector controller 422 and a point detection controller 424.

The point projector controller 422 can include one or more instructions to operate the emitter 140A or 140B. The point projector controller 422 can include instructions to activate and deactivate one or more light projection elements. The point projector controller 422 can synchronize or coordinate, for example, movement of the one or more light projection elements across field of illumination. The point projector controller 422 can move the light projection elements in accordance with one or more coordinate systems. As one example, the point projector controller 422 can move the one or more light projection elements in accordance with an angular step in an angular coordinate system. The step can be a fixed step, or a variable step in accordance with a function. The fixed step can be, but is not limited to 0.05° in an angular coordinate system, and the variable step function can be a function including a step size dependent at least partially on an angular displacement for an origin in a coordinate space, for example.

The point detection controller 424 can include one or more instructions to operate the receiver 130A or 130B. The point detection controller 424 can include instructions to activate and deactivate one or more detectors and one or more light projection elements. The point detection controller 424 can synchronize or coordinate, for example, movement of one or more light projection elements across an object. The point detection controller 424 can move the detectors or the one or more light projection elements including one or more of the detectors in accordance with one or more coordinate systems, and in coordinate with movement of the light projection elements. As one example, the point detection controller 424 can move the one or more light projection elements in accordance with an angular step in an angular coordinate system corresponding to the step and coordinate system of the point projector controller 422. The point detection controller 424 can also move the one or more light projection elements or the point capture elements at an offset in the coordinate system from the one or more light projection elements corresponding to the point projection elements. As one example, the point detection controller 424 can have a trailing offset in which the point detection controller 424 orients the one or more light projection elements or the point capture elements with respect to coordinates associated with a past orientation of the one or more light projection elements corresponding to the point projection elements.

The projector beam controller 430 can include one or more instructions to control one or more characteristics of a beam emitted by the emitters. The projector beam controller 430 can include a continuous mode controller 432 and a pulse mode controller 434. The continuous mode controller 432 can include one or more instructions to operate one or more beams of the emitters in a continuous mode. The continuous mode can include emitting a continuous wave. Continuous wave emission can be generated by operating an emitter laser of the emitters to produce amplified spontaneous emission (ASE). The pulse mode controller 434 can include one or more instructions to operate one or more beams of the emitters in a pulsed mode. The pulsed mode can include emitting one or more beams of the emitters at one or more predetermined periods, times, or the like.

The scan driver 440 can include one or more instructions to control operation of the emitters. The scan driver 440 can include instructions to operate the emitters in accordance with one or more movement patterns or the like. The scan driver 440 can provide instructions to the point projector controller 422 to execute operation in accordance with one or more movement patterns or the like. As one example, a scanning mirror can scan an axis of the field of view at a constant angular velocity. The constant angular velocity can be but is not limited to 0.5°/µs. The photocurrent from each pixel can be measured as a function of the time which has elapsed from the beginning of the scan. The scan driver 440 can include a scan direction controller 442, a scan velocity controller 444, and a scan timing controller 446. The scan direction controller 442 can include one or more instructions to control operation of the emitters with respect to displacement. In one embodiment, the laser beam is directed to specific angles using a MEMS scanning mechanism. In one embodiment the laser beam is directed to specific angles using a MEMS stepping mechanism. In one embodiment, a non-MEMS actuator directs the beam. The scan velocity controller 444 can include one or more instructions to control operation of the emitters with respect to rate of displacement. As one example, the scan angular velocity can be constant or not constant. As one example, a non-constant scan angular velocity can be sinusoidal. The scan timing controller 446 can include one or more instructions to control operation of the emitters with respect to period of displacement. The scan timing controller 446 can control timing of one or more of emitting of pulses, tracking or scanning across a field of view, or the like.

The scan timing calibration engine 450 can include one or more instructions to calibrate one or more of the receivers and the emitters. A mapping of mirror position times corresponding to peak receiver efficiency can be performed at least once. As one example, a first mapping can be performed during factory calibration. The mapping can be performed periodically during operation of the system. As one example, calibration can performed by scanning a continuous surface, such as a road, to identify the scanner times corresponding to peak receiver efficiency. A subset of the field of view can be scanned during periodic calibration, such as to minimally affect real-time acquisition, and the remaining timing points can be extrapolated by, for example, using a look-up table. The calibration process can generate a calibration look-up table. The look-up table may be occasionally updated. The look-up table contains times or time intervals during the scan of one or more scanning actuators, during which signal emission is allowed, including time intervals during which reflected signals will impinge sufficiently on the active area of a pixel. The spot size on the FPA is a function of the emitter beam divergence, the receiver optics, and the wavelength. In some examples, the spot size of the FPA is less than the pixel pitch to prevent the received signals from being smeared regardless of the calibration of the emission times by the scan timing calibration engine 450.

The scan timing calibration engine 450 can include one or more instructions to process and modify timestamps of points captured by the system. The scan timing calibration engine 450 can include a timing transformer 452 and a timing peak extractor 454. The timing transformer 452 can transform timestamps associated with one or more of the points returned from the receivers. The timing transformer 452 can transform timestamp to resolve a bidirectional scan into a unidirectional scan format, in accordance with FIGS. 5A-C.

The timing peak extractor 454 can include one or more instructions to identify peaks associated with returns points interacting with active areas of sensor pixels. An electrical circuit can digitize photocurrents from the sensor pixels and a processing element can detect the times of the peaks of the photocurrent. Those peaks can correspond to times when the scanner points in a direction imaged by the center of each of the active areas. As one example, emitters can emit laser pulses at a pulse repetition rate and at a pulse width which allows interpolation of the peak position. For example, at least 2 pulses can be emitted while the scanner's position is such that these pulses' returns overlap a pixel's active area, and the pulse width is significantly shorter than the pulse repetition cycle.

Figure 5A:
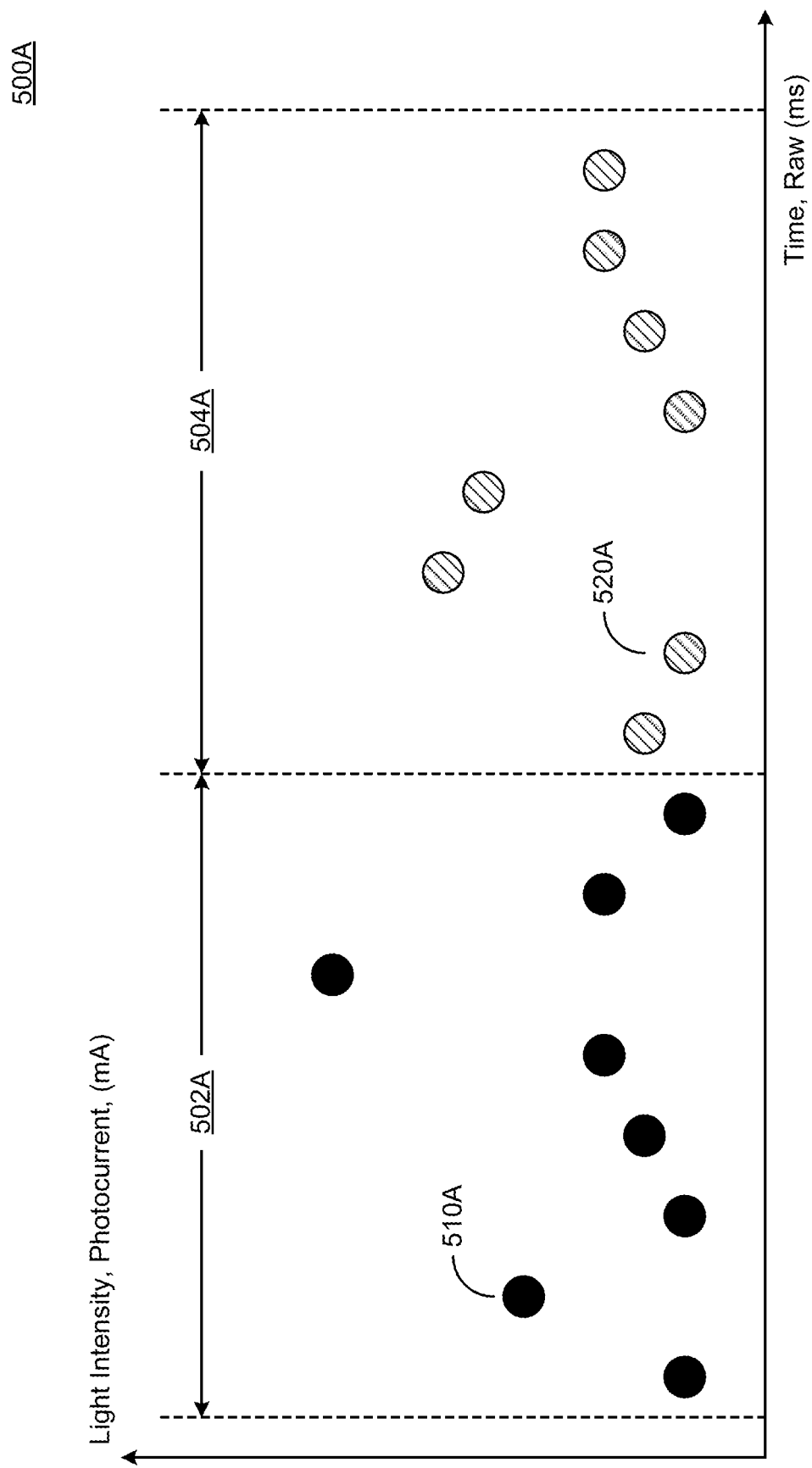
FIG. 5A illustrates a first example calibration state of a sensor device, in accordance with present implementations.

FIG. 5A illustrates a first example calibration state of a sensor device, in accordance with present implementations. As illustrated by way of example in FIG. 5A, a calibration state 500A can include a first set of intensities 510A in a first scan direction period 502A, and a second set of intensities 520A in a second scan direction period 504A. The first set of intensities 510A and the second set of intensities 520A are obtained with respect to and correspond to a target object being imaged. For instance, in one example, a LIDAR images a hemisphere such that all scanned points of the object are equidistant from the emitter and receiver. As such, the timing of the signals is a function of the position of the emitter scanner with respect to the active areas, and not a function of the time of flight of photons to targets of varying ranges. The first and second set of intensities 510A and 520A can be associated with an x-coordinate indicating a relative or absolute timestamp of capture, and a y-coordinate associated with a magnitude of a photocurrent response at a particular sensor pixel. A higher intensity in the y-coordinate direction can correspond to a time at which a sensor pixel receives light substantially aligned with an active area of the sensor pixel. Correspondingly, a lower intensity in the y-coordinate direction can correspond to a time at which a sensor pixel receives light substantially not aligned with an active area of the sensor pixel. The photocurrent can be under-sampled. As one example, a value of the photocurrent can be sampled at least at the Nyquist frequency which allows for the interpolation of the peak position.

Figure 5B:
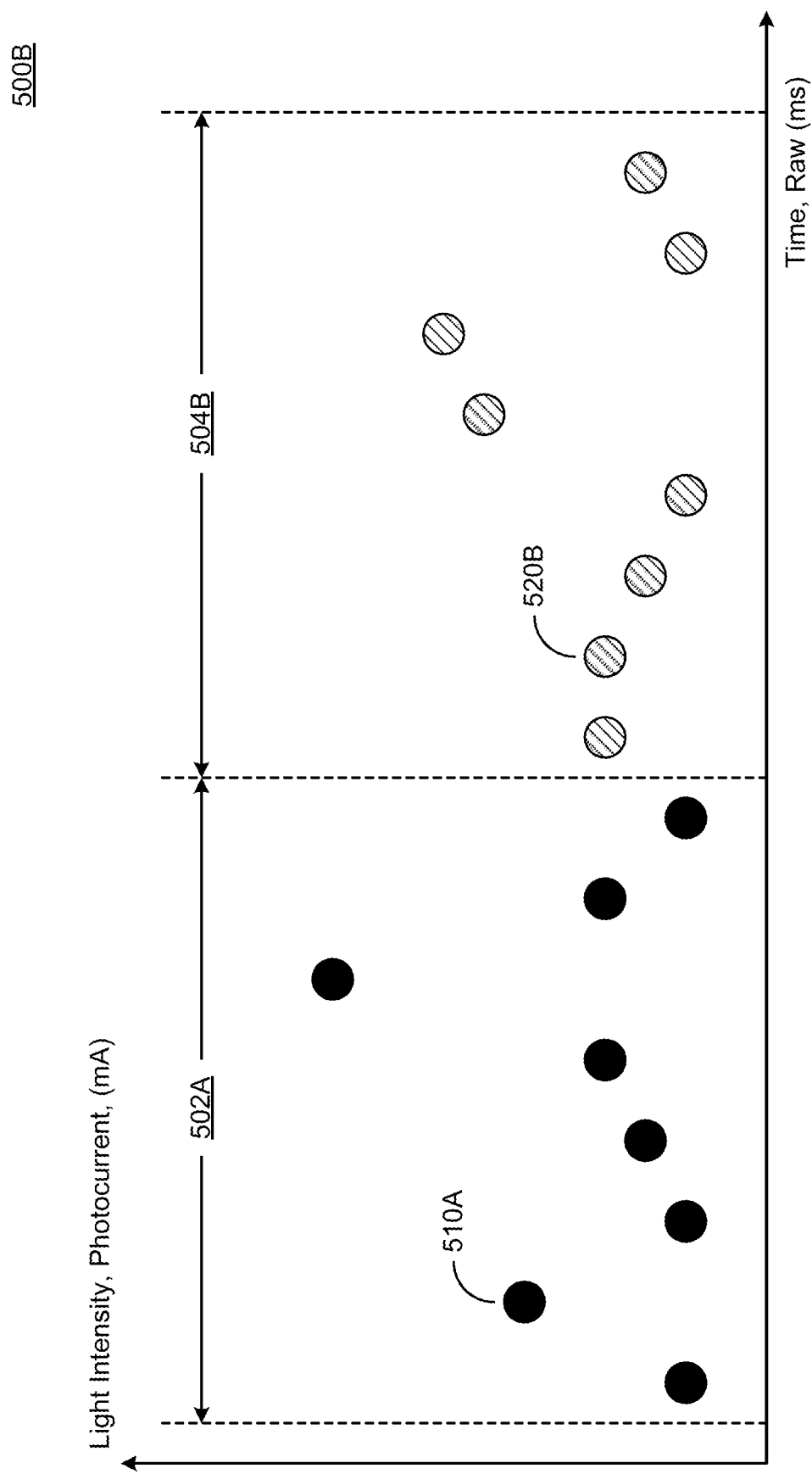
FIG. 5B illustrates a second example calibration state of a sensor device, further to the example state of FIG. 5A.

FIG. 5B illustrates a second example calibration state of a sensor device, further to the example state of FIG. 5A. As illustrated by way of example in FIG. 5B, a calibration state 500B can include the first set of intensities 510A in the first scan direction period 502A, and a second set of modified intensities 520B in a second modified scan direction period 504B. The second set of modified intensities 520B can be reversed within the second modified scan direction period 504B, to accommodate and resolve for a reversal in scan direction between the first scan direction period 502A and the second scan direction period 504A. Thus, the second set of modified intensities 520B can indicate shapes matching to those indicated by the first set of intensities 510A. The mapping can be obtained sequentially, over multiple scans. Consecutive scans can be carried out in opposite directions in order to minimize idle time. A system memory can store the signal values and times and fold those times to recreate a high-resolution calibration map as illustrated by way of example.

FIG. 5C illustrates a third example calibration state of a sensor device, further to the example state of FIG. 5B. As illustrated by way of example in FIG. 5C, a calibration state 500C can include the first set of intensities 510A and a second set of modified intensities 520C in the first scan direction period 502A. Timestamps of the second set of modified intensities 520B can be modified to generate the second set of modified intensities 520C. As one example, an amount of time elapsed for the first scan direction period 502A can be subtracted from each of the second set of modified intensities 520B to arrive at the second set of modified intensities 520C. By this modification to the timestamps of the second set of modified intensities 520C, both of the first set of intensities 510A and the second set of modified intensities 520C can be normalized to the first scan direction period 502A. Peaks 530 and 540 can be extracted based on the high-resolution bidirectional scan including the fully transformed points including the first set of intensities 510A and the second set of modified intensities 520C.

Figure 6:
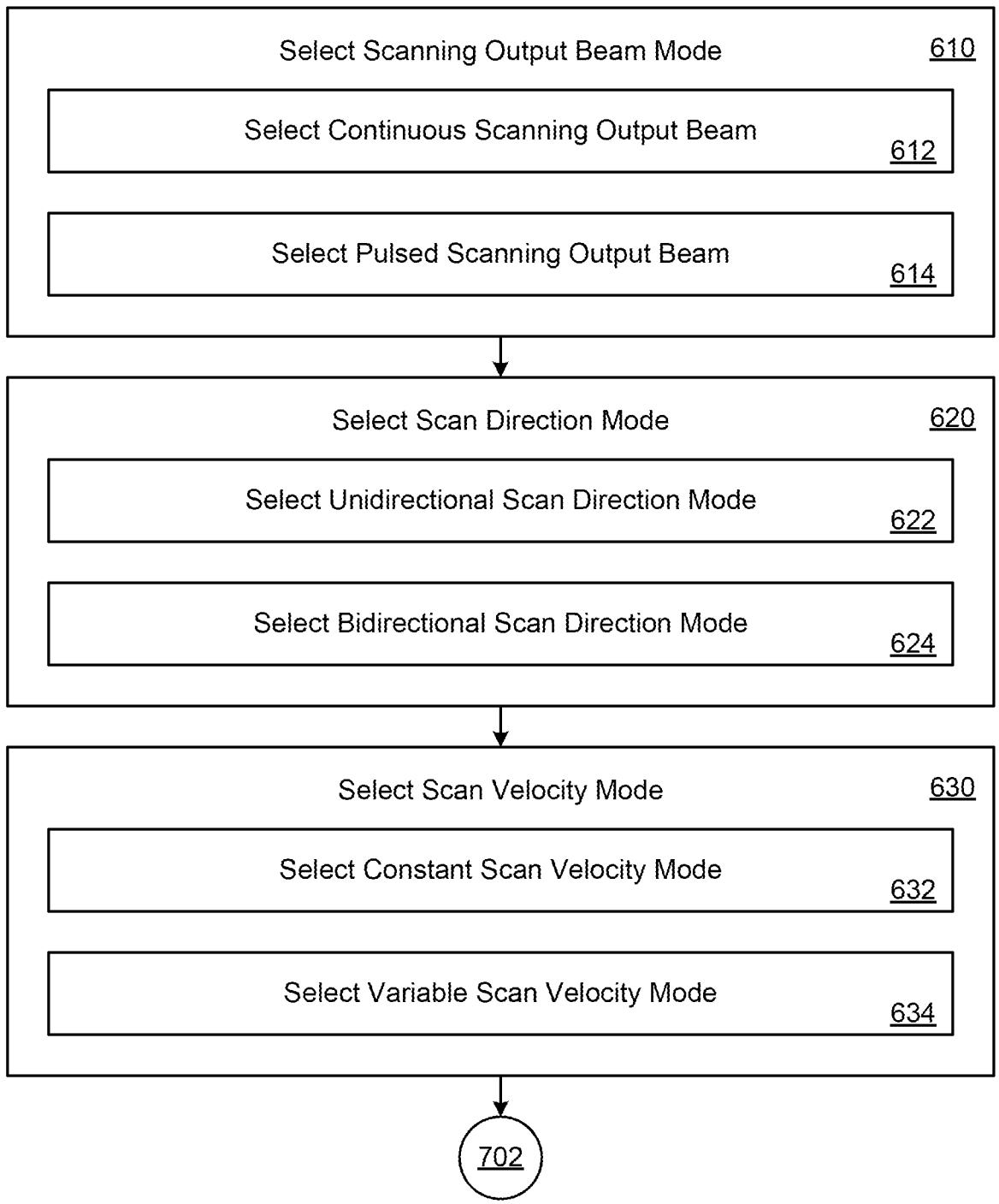
FIG. 6 illustrates an example method of calibration of low fill-factor sensor devices and object detection therewith, in accordance with present implementations.

FIG. 6 illustrates an example method of calibration of low fill-factor sensor devices and object detection therewith, in accordance with present implementations. At least one of the example systems 100 and 200 can perform method 600 according to present implementations. The method 600 can begin at step 610.

At step 610, the method 600 can select a scanning output beam mode. Step 610 can include at least one of steps 612 and 614. At step 612, the method 600 can select a continuous scanning output beam. At step 614, the method 600 can select a pulsed scanning output beam. The method 600 can then continue to step 620.

At step 620, the method 600 can select a scan direction mode. Step 620 can include at least one of steps 622 and 624. At step 622, the method 600 can select a unidirectional scan direction mode. At step 624, the method 600 can select a bidirectional scan direction mode. The method 600 can then continue to step 630.

At step 630, the method 600 can select a scan velocity mode. Step 630 can include at least one of steps 632 and 634. At step 632, the method 600 can select a constant scan velocity mode. At step 634, the method 600 can select a variable scan velocity mode. The method 600 can then continue to step 702.

Figure 7:
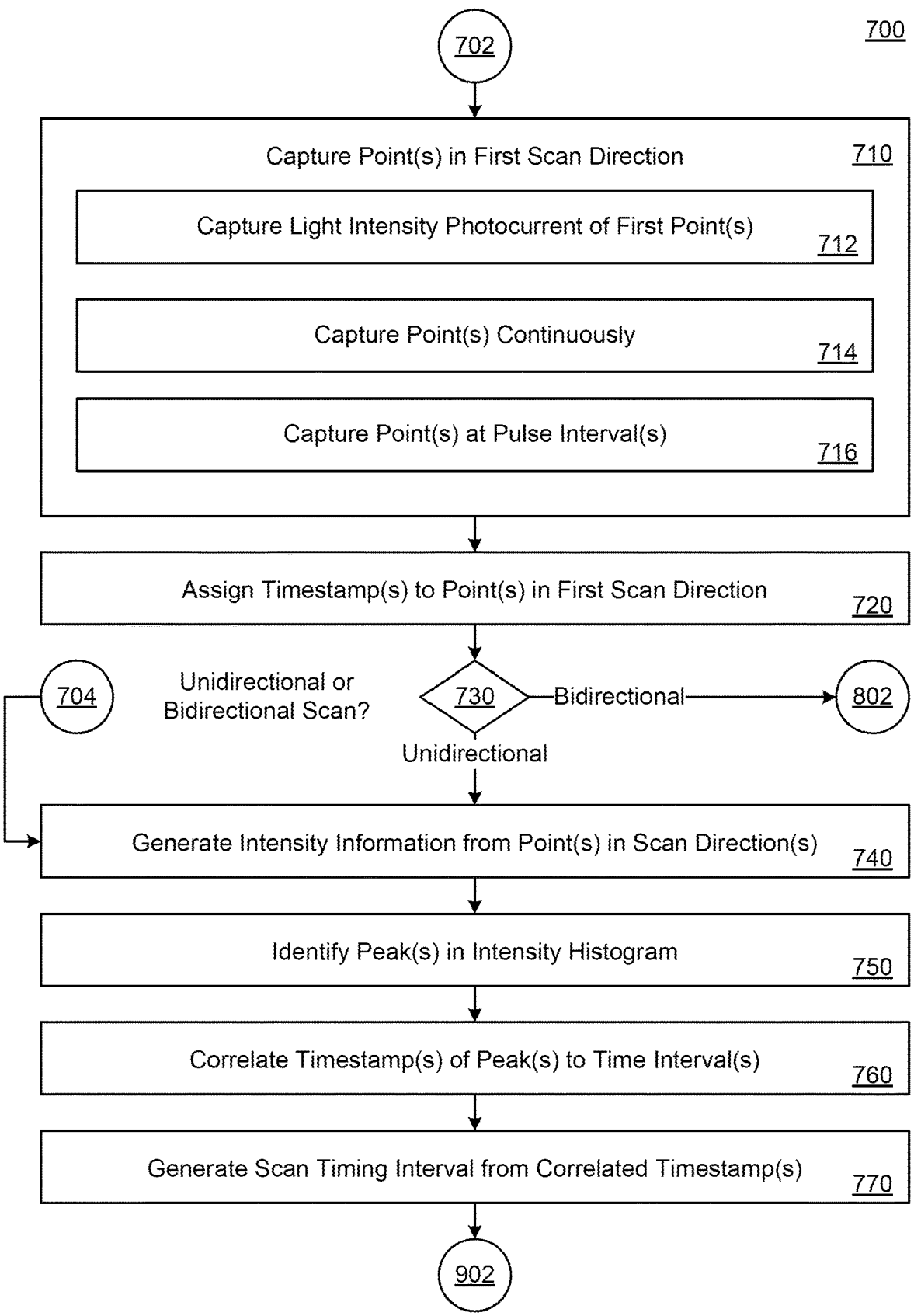
FIG. 7 illustrates an example method of calibration of low fill-factor sensor devices and object detection therewith, further to the example method of FIG. 6.

FIG. 7 illustrates an example method of calibration of low fill-factor sensor devices and object detection therewith, further to the example method of FIG. 6. At least one of the example systems 100 and 200 can perform method 700 according to present implementations. The method 700 can begin at step 702. The method 700 can then continue to step 710.

At step 710, the method 700 can capture one or more first points (e.g., returns) in a first scan direction. Step 710 can include at least one of steps 712, 714 and 716. At step 712, the method 700 can capture at least one light intensity photocurrent associated with one or more of the first points. At step 714, the method can capture the one or more first points continuously. At step 716, the method can capture one or more of the first points at one or more predetermined pulse intervals. The method 700 can then continue to step 720.

At step 720, the method 700 can assign one or more timestamps to one or more of the points in the first scan direction. The timestamps can correspond to a time of capture of each of the particular points. In some examples, the number of samples taken may be on the scale of thousands, tens of thousands, or hundreds of thousands. The method 700 can then continue to step 730.

At step 730, the method 700 can determine whether a unidirectional or bidirectional scan is performed, selected instructed, or the like. The scan direction controller 442 can make one or more determinations in accordance with step 730. In accordance with a determination that a unidirectional scan is performed, selected instructed, or the like, the method 700 can continue to step 740. Alternatively, in accordance with a determination that a bidirectional scan is performed, selected instructed, or the like, the method 700 can continue to step 802.

At step 740, the method 700 can generate intensity information from one or more points in one or more scan directions. The intensity information (e.g., at least one value of intensity) can correspond to one or more of calibration states 500A-C. The points used to generate the intensity information can include the points captured in the first scan direction, in the case of a unidirectional scan. The points used to generate the intensity information can include the points captured in the first scan direction and the points captured in the second scan direction, in the case of a bidirectional scan. The method 700 can then continue to step 750.

At step 750, the method 700 can identify one or more peaks in the intensity information. The method 700 can then continue to step 760.

At step 760, the method 700 can correlate one or more timestamps of the peaks to one or more time intervals. As one example, a time interval can be a time between peaks of the histogram. The method 700 can then continue to step 770.

At step 770, the method 700 can generate a scan timing interval based on the one or more correlated timestamps. The time interval can advantageously indicate the time periods in which a sufficient photocurrent response is less likely to be received at a sensor array, and can operate one or more sensor arrays to reduce sensing during the time interval or between the expected times of receiving peaks, in order to reduce receipt of unreliable or lost returned points, reduce power consumption and increase power efficiency of the system. The method 700 can then continue to step 902.

Figure 8:
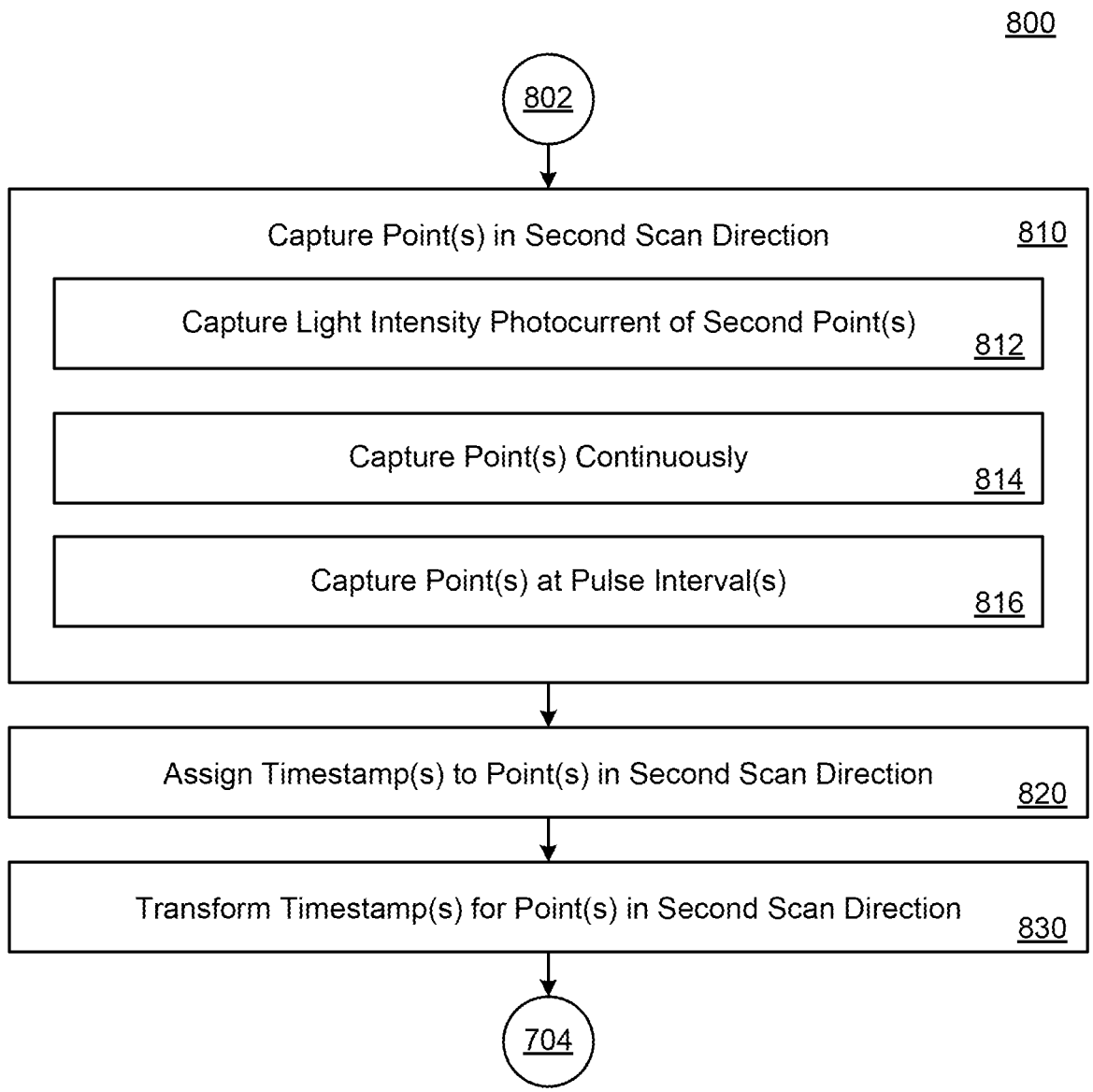
FIG. 8 illustrates an example method of calibration of low fill-factor sensor devices and object detection therewith, further to the example method of FIG. 7.

FIG. 8 illustrates an example method of calibration of low fill-factor sensor devices and object detection therewith, further to the example method of FIG. 7. At least one of the example systems 100 and 200 can perform method 800 according to present implementations. The method 800 can begin at step 802. The method 800 can then continue to step 810.

At step 810, the method 800 can capture one or more second points in a second scan direction. Step 810 can include at least one of steps 812, 814 and 816. At step 812, the method 800 can capture at least one light intensity photocurrent associated with one or more of the second points. At step 814, the method 800 can capture the one or more points continuously. At step 816, the method 800 can capture one or more of the points at one or more predetermined pulse intervals. The method 800 can then continue to step 820.

At step 820, the method 800 can assign one or more timestamps to one or more of the points in the second scan direction. The timestamps can correspond to a time of capture of each of the particular points. The method 800 can then continue to step 830.

At step 830, the method 800 can transform one or more timestamps associated with the second points. As one example, the method 800 can transform the timestamps associated with the second points in accordance with the modifications of calibration states 500A-C. The method 800 can then continue to step 704 and can continue to step 740.

Figure 9:
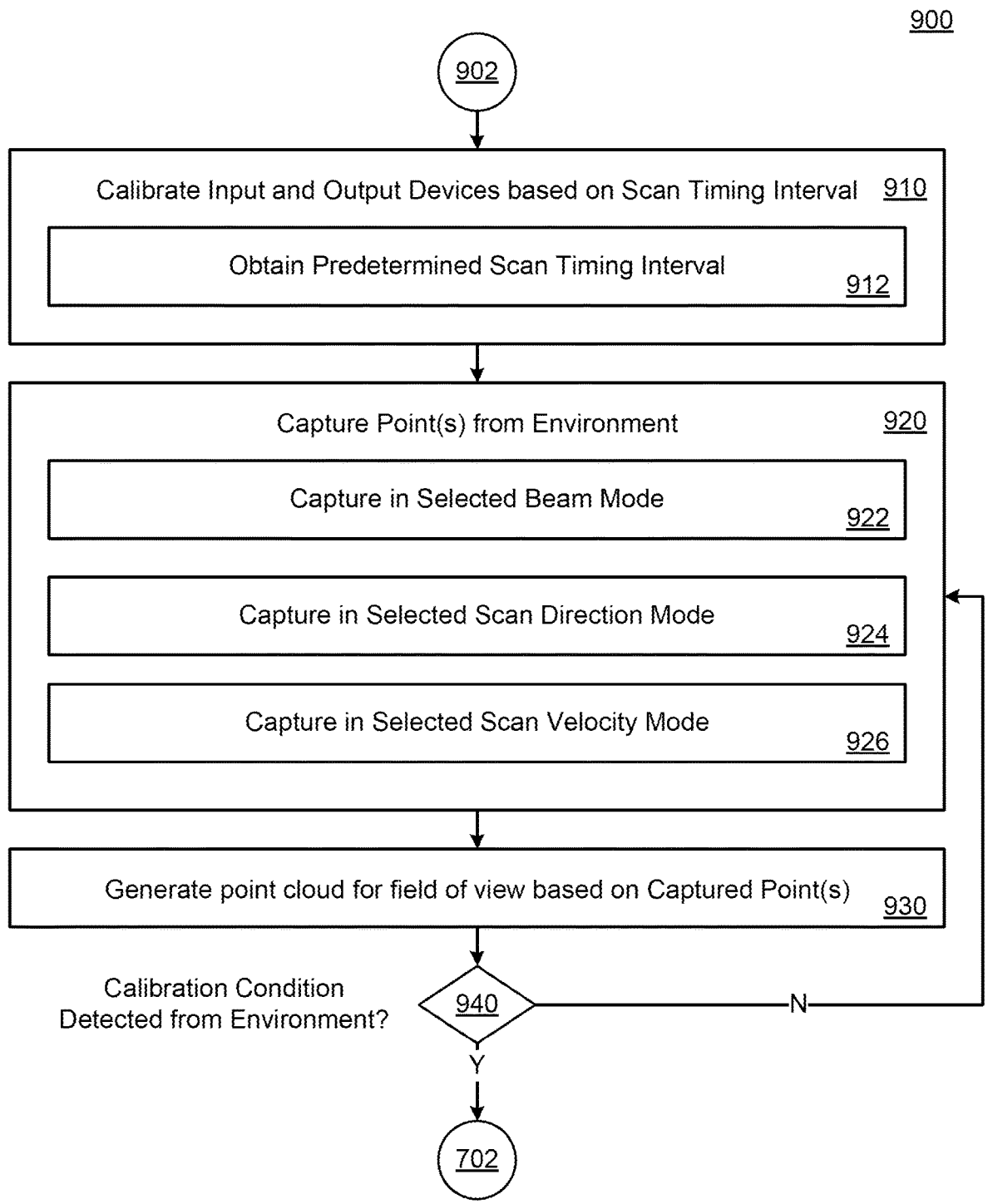
FIG. 9 illustrates an example method of calibration of low fill-factor sensor devices and object detection therewith, further to the example method of FIG. 8.

FIG. 9 illustrates an example method of calibration of low fill-factor sensor devices and object detection therewith, further to the example method of FIG. 8. At least one of the example systems 100 and 200 can perform method 900 according to present implementations. The method 900 can begin at step 902. The method 900 can then continue to step 910.

At step 910, the method 900 can calibrate one or more of one or more receivers and one or more emitter based on a scan timing interval. The one or more receivers can include receivers (e.g., receiver 130A, 130B) as discussed herein. The one or more emitters can include emitters (e.g., emitter 140A, 140B) as discussed herein. Step 910 can include step 912. At step 912, the method 900 can obtain a predetermined timing interval. The system processor 110 can obtain a predetermined scan timing interval from the system memory 120. The method 900 can then continue to step 920.

At step 920, the method 900 can capture one or more points from a physical object. Step 920 can include at least one of steps 922, 924 and 926. At step 922, the method 900 can capture one or more points according to a selected beam mode. At step 924, the method 900 can capture one or more points according to a selected scan direction mode. At step 926, the method can capture one or more points according to a selected scan velocity mode. The method 900 can then continue to step 930.

At step 930, the method 900 can generate a point cloud of the field of view based on the captured points. The point cloud is generated for or is corresponding to at least a portion of the physical object. The method 900 can then continue to step 940.

At step 940, the method 900 can determine whether a calibration condition is detected. The calibration condition can be detected from the physical object, or from the vehicle object. The calibration can be performed, for example, during a period when a vehicle is stopped at an intersection, or parked, or present with sensors able to detect another surface. The periodic mapping can be performed while the emitters are at rest, including but not limited to during turn-on or while stopping at an intersection. The scan driver 440 can determine angles to be interrogated by emitters and the scan timing controller 446 can use the lookup table to calculate the precise times within the gross times corresponding to the gross angles, during which signals are to be emitted. In accordance with a determination that a calibration condition is detected, the method 900 can continue to step 702 and can continue to step 710. Alternatively, in accordance with a determination that a calibration condition is not detected, the method 900 can continue to step 920.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of calibration of actively illuminated low fill-factor sensor devices and object detection therewith, the method comprising:
    capturing one or more returns in a first scan direction;
    assigning first timestamps corresponding to one or more of the one or more returns in the first scan direction;
    identifying one or more peaks corresponding to intensity of one or more of the one or more returns;
    correlating peak timestamps with one or more time intervals, the peak timestamps being associated with the one or more peaks;
    generating a scan timing interval based on the peak timestamps; and
    calibrating one or more input devices or output devices based on the scan timing interval.

2. The method of claim 1, further comprising:
    capturing one or more additional returns in a second scan direction, in accordance with a determination to operate a scanning beam in a bidirectional scan direction mode.

3. The method of claim 2, the identifying the one or more peaks comprising generating intensity information, wherein generating the intensity information comprises:
    assigning second timestamps corresponding to one or more of the one or more returns in the first scan direction; and transforming the second timestamps to correspond to the first timestamps in the first scan direction.

4. The method of claim 2, the identifying the one or more peaks comprising:
generating intensity information from one or more of the one or more returns in the first scan direction and one or more of the one or more additional returns in the second scan direction.

5. The method of claim 1, further comprising:
capturing one or more returns from a physical object based on the scan timing interval.

6. The method of claim 5, further comprising:
generating a point cloud based on the captured one or more returns, the point cloud corresponding to at least a portion of the physical object.

7. The method of claim 1, further comprising:
generating intensity information from one or more of the one or more returns in the first scan direction.

8. The method of claim 1, further comprising:
selecting at least one of a constant scan velocity mode and a variable scan velocity mode of the one or more input devices or output devices.

9. The method of claim 1, further comprising:
selecting at least one of a continuous scanning output beam mode and a pulsed scanning output beam mode of the one or more input devices or output devices.

10. A system of calibration of low fill-factor sensor devices and object detection therewith, the system comprising:
a point capture processor to capture one or more returns in a first scan direction, and assign first timestamps corresponding to one or more of the one or more returns in the first scan direction; and
a scan timing calibration engine to identify one or more peaks corresponding to intensity of one or more of the one or more returns, correlate peak timestamps with one or more time intervals, the peak timestamps being associated with the one or more peaks, generate a scan timing interval based on the peak timestamps, and calibrate one or more input devices or output devices based on the scan timing interval.

11. The system of claim 10, the point capture processor further configured to:
capture one or more additional returns in a second scan direction, in accordance with a determination to operate a scanning beam in a bidirectional scan direction mode.

12. The system of claim 11, the scan timing calibration engine further configured to:
assign second timestamps corresponding to one or more of the one or more returns in the first scan direction; and
transform the second timestamps to correspond to the first timestamps in the first scan direction.

13. The system of claim 11, the scan timing calibration engine further configured to:
generate intensity information from one or more of the one or more returns in the first scan direction and one or more of the one or more additional returns in the second scan direction.

14. The system of claim 10, the point capture processor further configured to:
capture one or more returns from a physical object based on the scan timing interval.

15. The system of claim 10, the scan timing calibration engine further configured to:
generate intensity information from one or more of the one or more returns in the first scan direction.

16. The system of claim 14, further comprising:
a scan driver to generate a point cloud based on the captured one or more returns, the point cloud corresponding to at least a portion of the physical object.

17. The system of claim 16, the scan driver further configured to:
select at least one of a constant scan velocity mode and a variable scan velocity mode of the one or more input devices or output devices.

18. The system of claim 16, the scan driver further configured to:
select at least one of a continuous scanning output beam mode and a pulsed scanning output beam mode of the one or more input devices or output devices.

19. A computer readable medium including one or more instructions stored thereon and executable by a processor to:
capture one or more returns in a first scan direction;
assign first timestamps corresponding to one or more of the one or more returns in the first scan direction;
identify one or more peaks corresponding to intensity of one or more of the one or more returns;
correlate peak timestamps with one or more time intervals, the peak timestamps being associated with the one or more peaks;
generate a scan timing interval based on the peak timestamps; and
calibrate one or more input devices or output devices based on the scan timing interval.

20. The computer readable medium of claim 19, wherein the computer readable medium further includes one or more instructions executable by the processor to:
capture one or more returns in a second scan direction, in accordance with a determination to operate a scanning beam in a bidirectional scan direction mode;
assign second timestamps corresponding to one or more of the one or more returns in the first scan direction; and
transform the second timestamps to correspond to the first timestamps in the first scan direction.

* * * * *